United States Patent Office.

WALTER T. SCHEELE, OF CATONSVILLE, MARYLAND, ASSIGNOR OF TWO-THIRDS TO HERMANN KNOLLENBERG AND WILLIAM F. ASSAU, OF BALTIMORE, MARYLAND.

SOUP MATERIAL AND METHOD OF MAKING SAME.

SPECIFICATION forming part of Letters Patent No. 707,646, dated August 26, 1902.

Application filed September 10, 1901. Serial No. 74,977. (No specimens.)

*To all whom it may concern:*

Be it known that I, WALTER T. SCHEELE, a subject of the Emperor of Germany, residing at Catonsville, in the county of Baltimore, State of Maryland, have invented certain new and useful Improvements in Desiccated Soup Material and Method of Preparing the Same, of which the following is a specification.

This invention relates to an improved desiccated food product consisting partly of animal and partly of vegetable matter and the method of preparing the same.

The object of the invention is to provide food in dried and concentrated form which will keep indefinitely and which is comparatively light and easily transported. While this food is designed for general use, it is particularly adapted for the use of armies and for use on trains, vessels, and at distant points where the expense of transportation adds largely to the cost of ordinary foods.

The food product prepared according to the process hereinafter described consists of a dried and pulverized mixture of meat and flour which is fermented and uncooked, the fibrin of the meat being digested and the albumen uncoagulated. This food product will keep indefinitely without losing the flavor and nutriment of the meat of which it is made. By mixing it with different quantities of hot water thick or thin soup can be instantly prepared. The process of preparing the food will now be described.

In carrying out the invention I first take a quantity of fresh meat of any desired variety and chop the same into small pieces. To one hundred pounds of chopped meat I add about one hundred and fifty pounds of flour and about twenty-five ounces of yeast, together with sufficient water to reduce the mass to a pasty condition. This pasty mass is then kept at a temperature of about 120° Fahrenheit for a suitable time, usually several hours, during which time fermentation takes place. In case the fermentation becomes too violent I add a small quantity—say two ounces—of chemically pure bicarbonate of soda. After sufficient fermentation the mixture is spread in thin layers on tables or trays and dried at a temperature of about 140° Fahrenheit. When thus dried, the material is reduced to fine powder. During this process a ferment is formed of sufficient digestive power to digest the fibrin and its accompanying substances in the animal matter.

Having thus described my invention, what I claim, and desire to secure by Letters Patent, is—

1. The process of preparing a desiccated food product which consists in comminuting a quantity of fresh meat; mixing therewith a quantity of flour, a small quantity of yeast, and sufficient water to reduce the whole to a pasty condition; permitting the pasty mass thus prepared to stand for several hours subject to a temperature suitable to cause fermentation to take place; and finally drying the mass at a low temperature.

2. The process of preparing a desiccated food product which consists in mixing together comminuted fresh meat, flour, yeast and water substantially in the proportions of one hundred pounds of meat, one hundred and fifty pounds of flour, twenty-five ounces of yeast, and sufficient water to form a pasty mass; fermenting the mass at a temperature of about 120° for several hours; spreading the mass and drying the same at a temperature of about 140°, and finally grinding or comminuting the product thus formed.

3. The desiccated pulverized food product consisting of fermented uncooked meat and flour, the fibrin of the meat being digested and the albumen uncoagulated, substantially as described.

In testimony whereof I affix my signature in presence of two witnesses.

WALTER T. SCHEELE.

Witnesses:
CHARLES H. MILLIKIN,
SADIE C. REINHARD.